(12) United States Patent
Fitzgerald et al.

(10) Patent No.: US 7,809,592 B2
(45) Date of Patent: Oct. 5, 2010

(54) SYSTEM AND METHOD FOR PROCESSING TRIP REQUESTS

(75) Inventors: Matt Fitzgerald, Omaha, NE (US); Philip A. Garcia, Phoenix, AZ (US); Debbie L. Schultz, Scottsdale, AZ (US); Michael Keith Laughlin, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/468,241

(22) Filed: Aug. 29, 2006

(65) Prior Publication Data

US 2006/0287881 A1 Dec. 21, 2006

Related U.S. Application Data

(60) Division of application No. 10/347,105, filed on Jan. 17, 2003, which is a continuation-in-part of application No. 10/217,666, filed on Aug. 12, 2002, now Pat. No. 7,499,864.

(60) Provisional application No. 60/351,804, filed on Jan. 25, 2002.

(51) Int. Cl.
*G06Q 10/00* (2006.01)
(52) U.S. Cl. ........................................ 705/5
(58) Field of Classification Search ............ 705/5, 705/1.1
See application file for complete search history.

(56) References Cited

U.S. PATENT DOCUMENTS

| 4,359,631 | A | 11/1982 | Lockwood et al. |
| 4,449,186 | A | 5/1984 | Kelly et al. |
| 4,490,810 | A | 12/1984 | Hon |
| 4,818,854 | A | 4/1989 | Davies et al. |
| 4,845,625 | A | 7/1989 | Stannard |
| 4,862,357 | A | 8/1989 | Ahlstrom et al. |
| 4,922,439 | A | 5/1990 | Greenblatt |

(Continued)

FOREIGN PATENT DOCUMENTS

EP 0762306 3/1997

(Continued)

OTHER PUBLICATIONS

Galileo.com, "Galileo International Subsidiary Quantitude, Inc. Begins Global Network Rollout", Jul. 31, 2000, http://galileo.com/galileo/en-us/news/Press/Releases/ARchive/2000/07/Quantitude+Roll+Out +July+31+2000.htm.*

(Continued)

*Primary Examiner*—John W Hayes
*Assistant Examiner*—Shannon S Saliard
(74) *Attorney, Agent, or Firm*—Snell & Wilmer L.L.P.

(57) ABSTRACT

A system and method for planning trips and for processing trip requests that utilizes a centralized network for facilitating travel reservations and/or services. The system includes multi-purpose point of service terminals that provide a plurality of modules for various travel related applications such as an integrated e-mail booking module, a computer telephony integration module, a super passenger name record database, a customer database, a trip planning module, a customer relationship management module, a workflow module, and a low fare search module.

19 Claims, 11 Drawing Sheets

U.S. PATENT DOCUMENTS

| | | | |
|---|---|---|---|
| 4,965,763 A | 10/1990 | Zamora | |
| 5,021,953 A | 6/1991 | Webber et al. | |
| 5,056,019 A | 10/1991 | Schultz et al. | |
| 5,155,678 A | 10/1992 | Fukumoto et al. | |
| 5,191,523 A | 3/1993 | Whitesage | |
| 5,235,509 A | 8/1993 | Mueller et al. | |
| 5,235,680 A | 8/1993 | Bijnagte | |
| 5,237,499 A | 8/1993 | Garback | |
| 5,239,480 A | 8/1993 | Huegel | |
| 5,241,671 A | 8/1993 | Reed et al. | |
| 5,253,165 A | 10/1993 | Leiseca et al. | |
| 5,253,166 A | 10/1993 | Dettelbach et al. | |
| 5,255,184 A | 10/1993 | Hornick et al. | |
| 5,270,921 A | 12/1993 | Hornick | |
| 5,274,758 A | 12/1993 | Beitel et al. | |
| 5,287,278 A | 2/1994 | Rau | |
| 5,289,371 A | 2/1994 | Abel et al. | |
| 5,331,546 A | 7/1994 | Webber et al. | |
| 5,393,964 A | 2/1995 | Hamilton et al. | |
| 5,408,417 A | 4/1995 | Wilder | |
| 5,422,809 A | 6/1995 | Griffin et al. | |
| 5,459,306 A | 10/1995 | Stein et al. | |
| 5,483,444 A | 1/1996 | Heintzeman et al. | |
| 5,526,443 A | 6/1996 | Nakayama | |
| 5,570,283 A | 10/1996 | Shoolery et al. | |
| 5,581,461 A | 12/1996 | Coll et al. | |
| 5,598,557 A | 1/1997 | Doner et al. | |
| 5,644,721 A | 7/1997 | Chung et al. | |
| 5,648,900 A | 7/1997 | Bowen et al. | |
| 5,652,842 A | 7/1997 | Siegrist, Jr. et al. | |
| 5,675,723 A * | 10/1997 | Ekrot et al. | 714/4 |
| 5,687,322 A | 11/1997 | Deaton et al. | |
| 5,761,442 A | 6/1998 | Barr et al. | |
| 5,764,981 A | 6/1998 | Brice et al. | |
| 5,781,892 A | 7/1998 | Hunt et al. | |
| 5,809,478 A | 9/1998 | Grfeco et al. | |
| 5,812,134 A | 9/1998 | Pooser et al. | |
| 5,832,451 A * | 11/1998 | Flake et al. | 705/5 |
| 5,832,453 A | 11/1998 | O'Brien | |
| 5,832,454 A * | 11/1998 | Jafri et al. | 705/6 |
| 5,839,114 A | 11/1998 | Lynch et al. | |
| 5,842,176 A | 11/1998 | Hunt et al. | |
| 5,857,175 A | 1/1999 | Day et al. | |
| 5,884,272 A | 3/1999 | Walker et al. | |
| 5,894,311 A | 4/1999 | Jackson | |
| 5,894,475 A | 4/1999 | Bruno et al. | |
| 5,897,620 A | 4/1999 | Walker et al. | |
| 5,909,510 A | 6/1999 | Nakayama | |
| 5,918,022 A | 6/1999 | Batz et al. | |
| 5,918,209 A | 6/1999 | Campbell et al. | |
| 5,926,798 A | 7/1999 | Carter | |
| 5,940,803 A | 8/1999 | Kanemitsu | |
| 5,948,040 A | 9/1999 | DeLorme et al. | |
| 5,953,706 A | 9/1999 | Patel | |
| 5,960,383 A | 9/1999 | Fleischer | |
| 5,968,125 A | 10/1999 | Garrick et al. | |
| 5,974,396 A | 10/1999 | Anderson et al. | |
| 5,983,246 A | 11/1999 | Takano | |
| 5,987,252 A | 11/1999 | Leino et al. | |
| 5,995,939 A | 11/1999 | Berman et al. | |
| 5,999,728 A | 12/1999 | Cable | |
| 6,009,403 A | 12/1999 | Sato | |
| 6,009,408 A | 12/1999 | Buchanan | |
| 6,012,069 A | 1/2000 | Shibazaki | |
| 6,018,715 A | 1/2000 | Lynch et al. | |
| 6,018,718 A | 1/2000 | Walker et al. | |
| 6,023,679 A | 2/2000 | Acebo et al. | |
| 6,024,288 A | 2/2000 | Gottlich et al. | |
| 6,028,601 A | 2/2000 | Machiraju et al. | |
| 6,029,144 A | 2/2000 | Barrett et al. | |
| 6,067,532 A | 5/2000 | Gebb | |
| 6,070,147 A | 5/2000 | Harms et al. | |
| 6,085,164 A | 7/2000 | Smith et al. | |
| 6,085,169 A | 7/2000 | Walker et al. | |
| 6,085,976 A | 7/2000 | Sehr | |
| 6,101,477 A | 8/2000 | Hohle et al. | |
| 6,112,185 A | 8/2000 | Walker et al. | |
| 6,118,989 A | 9/2000 | Abe et al. | |
| 6,119,094 A | 9/2000 | Lynch et al. | |
| 6,119,095 A | 9/2000 | Morita | |
| 6,119,096 A | 9/2000 | Mann et al. | |
| 6,119,229 A | 9/2000 | Martinez et al. | |
| 6,121,969 A | 9/2000 | Jain et al. | |
| 6,122,642 A | 9/2000 | Mehovic | |
| 6,134,534 A | 10/2000 | Walker et al. | |
| 6,148,290 A | 11/2000 | Dan et al. | |
| 6,151,582 A | 11/2000 | Huang et al. | |
| 6,157,915 A | 12/2000 | Bhaskaran et al. | |
| 6,157,918 A | 12/2000 | Shepherd | |
| 6,163,771 A | 12/2000 | Walker et al. | |
| 6,167,368 A | 12/2000 | Wacholder | |
| 6,185,524 B1 | 2/2001 | Carus et al. | |
| 6,185,558 B1 | 2/2001 | Bowman et al. | |
| 6,185,592 B1 | 2/2001 | Boguraev et al. | |
| 6,188,989 B1 | 2/2001 | Kennedy | |
| 6,195,644 B1 | 2/2001 | Bowie | |
| 6,199,147 B1 | 3/2001 | Smith et al. | |
| 6,223,163 B1 | 4/2001 | Van Luchene | |
| 6,229,534 B1 | 5/2001 | Gerra et al. | |
| 6,263,315 B1 | 7/2001 | Talluri | |
| 6,292,790 B1 | 9/2001 | Krahn et al. | |
| 6,304,850 B1 | 10/2001 | Keller et al. | |
| 6,324,517 B1 | 11/2001 | Bingham et al. | |
| 6,336,097 B1 | 1/2002 | Scipioni | |
| 6,442,526 B1 | 8/2002 | Vance et al. | |
| 6,477,520 B1 | 11/2002 | Malaviya et al. | |
| 6,754,634 B1 | 6/2004 | Ho | |
| 6,785,608 B1 | 8/2004 | Milici et al. | |
| 6,804,658 B2 | 10/2004 | Lim et al. | |
| 6,839,679 B1 | 1/2005 | Lynch et al. | |
| 6,944,133 B2 * | 9/2005 | Wisner et al. | 370/242 |
| 6,963,854 B1 | 11/2005 | Boyd et al. | |
| 7,016,859 B2 | 3/2006 | Whitesage | |
| 7,050,986 B1 | 5/2006 | Vance et al. | |
| 7,165,036 B2 | 1/2007 | Kruk et al. | |
| 7,302,399 B1 * | 11/2007 | Donovan et al. | 705/5 |
| 2001/0005831 A1 | 6/2001 | Lewin et al. | |
| 2001/0029478 A1 | 10/2001 | Laster et al. | |
| 2001/0034626 A1 | 10/2001 | Gillespie | |
| 2001/0047289 A1 | 11/2001 | McKee et al. | |
| 2001/0049693 A1 | 12/2001 | Pratt | |
| 2001/0051885 A1 | 12/2001 | Nardulli et al. | |
| 2001/0054105 A1 * | 12/2001 | Furusawa et al. | 709/227 |
| 2002/0010604 A1 | 1/2002 | Block | |
| 2002/0013774 A1 | 1/2002 | Morimoto | |
| 2002/0077871 A1 * | 6/2002 | Udelhoven et al. | 705/5 |
| 2002/0143587 A1 | 10/2002 | Champernowne | |
| 2002/0147823 A1 * | 10/2002 | Healy | 709/230 |
| 2002/0152100 A1 | 10/2002 | Chen et al. | |
| 2002/0152101 A1 | 10/2002 | Lawson et al. | |
| 2002/0178034 A1 | 11/2002 | Garner et al. | |
| 2003/0040946 A1 | 2/2003 | Sprenger et al. | |
| 2003/0055690 A1 | 3/2003 | Garback | |
| 2003/0110063 A1 | 6/2003 | Among et al. | |
| 2003/0115159 A1 | 6/2003 | Gillespie | |
| 2003/0120526 A1 * | 6/2003 | Altman et al. | 705/5 |
| 2003/0140007 A1 * | 7/2003 | Kramer et al. | 705/40 |
| 2003/0144867 A1 | 7/2003 | Campbell et al. | |
| 2004/0260581 A1 | 12/2004 | Baranowski et al. | |
| 2004/0267623 A1 * | 12/2004 | Vivadelli et al. | 705/26 |
| 2005/0015295 A1 | 1/2005 | Mcculloch | |
| 2006/0111956 A1 | 5/2006 | Whitesage | |
| 2006/0146806 A1 * | 7/2006 | Khuc et al. | 370/352 |
| 2006/0212321 A1 | 9/2006 | Vance et al. | |

| | | |
|---|---|---|
| 2007/0055555 A1 | 3/2007 | Baggett et al. |

FOREIGN PATENT DOCUMENTS

| | | |
|---|---|---|
| FR | 2586316 | 2/1987 |
| JP | 2002-32682 | 1/2002 |
| WO | WO 95/26007 | 9/1995 |
| WO | WO 97/17680 | 5/1997 |
| WO | WO 01/04823 | 1/2001 |
| WO | WO 01/61607 | 8/2001 |
| WO | WO 02/029672 | 4/2002 |

OTHER PUBLICATIONS

Galileo International Inc. Annual Report (10-k) Item 1. Business. Mar. 31, 2001, pp. 1-24.*
Web Ventures Announces Version 4 of "BookIt Pro—Gives Full Travel Agent Access to Airline Computer Reservations Systems Over the Internet", Oct. 1998; Pr Newswire; dialog copy, 2 pgs.
ITT Business Travel News, Jul. 15, 1996, ISSN#8750-3670, p. 36.
Maritz Deal, www.findarticles.com, Feb. 14, 2000.
"The Table Lens: Merging Graphical and Symbolic Representations in an Interactive Focus + Context Visualization for Tabular Information", by R. Rao and S. Card, Human Factors in Computing Systems, CHI '94, "Celebrating Independence", pp. 318-322, 481-482.
"An Evaluation of Statistical Approaches to Text Categorization", Yiming Yang, Apr. 10, 1997, CMU-CS-97-127.
thefreedictionary.com website; Dec. 12, 2005; 1 page.
Orbitz web site; Sep. 30, 2001, Wayback Machine web archive site, 1 page.
Travelocity web site; Nov. 21, 2001, Wayback Machine web archive site, 2 pages.
Fichter and Cervone; Documents, Data Information Retrieval, & XML; document retrieval: difficulties of retrieving information from document repositories Online Nov. 1, 2000.
"Chapter 3—Memory Management", www.linushq.com/guides/tlk/mm/memory.html, copyright 1996-1999.
"Memory Offset Annotation", www.tacc.utexas.edu/services/userguides/intel/ref/ann-mem.htm.
Clemons, Eric K, et al., Ahead of the Pack Through Vision and Hustle: A Case Study of Information Technology at Rosenbluth Travel, Proceedings of the Twenty-Fourth Annual Hawaii International Conference on System Sciences, vol. 4, Jan. 1991, pp. 287-296.
Greenberg, Ilan, Travelnet to help corporations stem travel expense tide InfoWorld, vol. 17, No. 29, Jul. 17, 1995, p. 25.
Rosenbluth International and AT&T to Provide Business New Travel Solution PR Newswire, Jul. 19, 1995.
Clemons, Eric K., et al., Rosenbluth International: Strategic Transformation of a Successful Enterprise Proceedings of the Thirty Second Hawaii International Conference on System Sciences, 1999.
DiFlorio, Dionino, et al., Air Deal Manager: American Express Provides an End to End Purchasing Management Solution SAS Conferences XVII SEUGI, Jun. 1999.
Rosenbluth International Files Suit Against Travel Analytics for Violation of Patent Infringement Laws, PR Newswire, Mar. 17, 2000.
Jones, David, Modeling Tools Mature, Business Travel News, vol. 18, Jan. 15, 2001.
Navigant International Launches Unique Internet-Accessible, Intuitive Reporting Platform, PR Newswire, Jan. 18, 2001.
DiFlorio, Diono, et al., Air Deal Manager: Corporate Travel Expense Optimisation with the SAS System SAS Converence XIX SEUGI, May-Jun. 2001.
Campbell, Jay, Dacoda opens for biz: Rosenbluth launches contract optimization service for non-clients, Business Travel News, vol. 18, No. 24, Nov. 12, 2001.
Simbologica Web Pages, Simbologica, http://www.simbologica.it, Oct. 2006.
Shepherd, David, SLAM Model of Domestic Airline Passenger Fairs and the Contract Air Service Program, Air Force Institute of Technology, Sep. 1986.
Travel Manager's Workstation, Travel Systems Institute, 1993, pp. 9-35.
Fee, John, "Through the Electronic Looking Glass into Living Pictures", Popular Science, Aug. 1981, pp. 68-70.
Yan, et al., "L-CATA: A Logic-Based Expert Travel System", Computer Science in Economics and Management 4; Aug. 1, 1991, pp. 151-163.
Yenckel, James, "Thrifty fliers find network of routes to fare deals", Chicago Sun Times, Feb. 17, 1991.
American Express unveils "American Express @ Work, new desktop portal for corporate travel & purchasing", by PR Newswire, Jul. 19, 1999.
Gerwig, Kate, "Online Corporate Traveler", InternetWeek, Sep. 14, 1998.
"American Express launches B2B travel booking technology for mid-sized companies", Canada Newswire, May 29, 2000.
"American Express launches online business travel fulfillment services", PR Newswire, Oct. 16, 2000.
Rogers, et al., "An adaptive interactive agent for route advice", ACM 1999.
Friedman, et al., "Bias in computer systems", ACM, 1996.
Linden, et al., "Interactive assessment of user preference models: The automated travel assistant", white paper by the Department of Computer Science and Engineering, University of Washington, 1996.
Clemons, et al., "The Nature of Competition in Electronic Markets: An Empirical investigation of the electronic travel agent market", WISE, 1997.
Clemons, et al., "The Nature of Competition in Electronic Markets: an Empirical investigation of the electronic travel agent offerings", white paper by the Department of Operations and Information Management, The Wharton School, Jun. 1999.
Kowtko, et al, "Data collection and analysis in the air travel planning domain", DARPA Speech and Natural Language Workshop 1989.
Upton, Gill, "Deals on Wheels", Supply Management, Jan. 15, 1998.
"BookIt! Is the internet booking engine of choice for online travel reservations" PR Newswire, Feb. 17, 1999.
"British Airways: Fifty pluses take flight online", M2 Presswire, Feb. 26, 2001.
"First Integrated Online Travel Management System Offers Cost Control, Compliance with Corporate Travel Policy: Sixth Largest Navigant International first Major User", Jul. 7, 1999, Baltimore-Business Wire, 1 pg.
Travelguidessoftware.com (Nov. 27, 1999) 12 pgs.
Coyne, Robert M., "Global connectivity", Hotel & Motel Management, Apr. 22, 1996, vol. 211 Issue 7, p. 28.
Straayer, Russell, "Overview of Frame Relay", www.dcbnet.com/notes/framerl.html, Mar. 1997.
Techfest, "Asynchronous Transfer Mode Overview", www.techfest.com, Aug. 17, 2000.
Non-Final Office Action dated Feb. 5, 2009 in U.S. Appl. No. 10/347,105.
Final Office Action dated Feb. 6, 2009 in U.S. Appl. No. 11/468,228.
Final Office Action dated Feb. 6, 2009 in U.S. Appl. No. 11/468,237.
Non-Final Office Action dated Feb. 13, 2009 in U.S. Appl. No. 10/708,542.
Non-Final Office Action dated Apr. 15, 2004 in U.S. Appl. No. 10/217,666.
Advisory Action dated Jan. 9, 2004 in U.S. Appl. No. 10/217,666.
Final Office Action dated Oct. 29, 2003 in U.S. Appl. No. 10/217,666.
Non-Final Office Action dated May 12, 2003 in U.S. Appl. No. 10/217,666.
ISR dated Mar. 8, 2004 in Serial No. PCT/US03/36991.
Notice of Allowance dated Nov. 18, 2008 in U.S. Appl. No. 10/611,037.
ISR dated Oct. 25, 2002 in Serial No. PCT/US02/21160.
ISR dated May 7, 2003 for PCT/US03/01718.
Requirement for Restriction/Election dated May 5, 2006 in U.S. Appl. No. 10/188,768.
Non-Final Office Action dated Aug. 9, 2006 in U.S. Appl. No. 10/188,768.
Final Office Action dated Mar. 12, 2007 in U.S. Appl. No. 11/188,768.
Advisory Action dated May 11, 2007 in U.S. Appl. No. 10/188,768.
Non-Final Office Action dated Jul. 26, 2007 in U.S. Appl. No. 10/188,768.

Final Office Action dated Nov. 28, 2007 in U.S. Appl. No. 10/188,768.
Advisory Action dated Apr. 9, 2008 in U.S. Appl. No. 10/188,768.
Non-Final Office Action dated Nov. 14, 2008 in U.S. Appl. No. 10/188,768.
Non-Final Office Action dated Oct. 19, 2007 in U.S. Appl. No. 10/611,037.
Final Office Action dated May 15, 2008 in U.S. Appl. No. 10/611,037.
Advisory Action dated Jul. 29, 2008 in U.S. Appl. No. 10/611,037.
Non-Final Office Action dated Sep. 5, 2008 in U.S. Appl. No. 10/611,037.
Non-Final office Action dated Oct. 6, 2005 in U.S. Appl. No. 10/708,542.
Final Office Action dated Apr. 6, 2005 in U.S. Appl. No. 10/708,542.
Non-Final Office Action dated Nov. 16, 2006 in U.S. Appl. No. 10/708,542.
Final Office Action dated Jul. 23, 2007 in U.S. Appl. No. 10/708,542.
Non-Final Office Action dated Jan. 28, 2008 in U.S. Appl. No. 10/708,542.
Final Office Action dated Sep. 3, 2008 in U.S. Appl. No. 10/708,542.
Requirement for Restriction/Election dated Aug. 21, 2006 in U.S. Appl. No. 10/347,105.
Non-Final Office Action dated Oct. 31, 2006 in U.S. Appl. No. 10/347,105.
Final Office Action dated Apr. 5, 2007 in U.S. Appl. No. 10/347,105.
Advisory Action dated Jun. 12, 2007 in U.S. Appl. No. 10/347,105.
Non-Final Office Action dated Sep. 25, 2007 in U.S. Appl. No. 10/347,105.
Final Office Action dated Jan. 29, 2008 in U.S. Appl. No. 10/347,105.
Advisory Action dated Mar. 7, 2008 in U.S. Appl. No. 10/347,105.
Non-Final Office Action dated Apr. 17, 2008 in U.S. Appl. No. 10/347,105.
Final Office Action dated Oct. 20, 2008 in U.S. Appl. No. 10/347,105.
Non-Final Office Action dated Feb. 15, 2008 in U.S. Appl. No. 11/468,228.
Final Office Action dated May 19, 2008 in U.S. Appl. No. 11/468,228.
Advisory Action dated Jul. 21, 2008 in U.S. Appl. No. 11/468,228.
Non-Final Office Action dated Oct. 8, 2008 in U.S. Appl. No. 11/468,228.
Non-Final Office Action dated Mar. 22, 2007 in U.S. Appl. No. 11/468,237.
Final Office Action dated Sep. 21, 2007 in U.S. Appl. No. 11/468,237.
Non-Final Office Action dated Jan. 16, 2008 in U.S. Appl. No. 11/468,237.
Final Office Action dated Jun. 17, 2008 in U.S. Appl. No. 11/468,237.
Advisory Action dated Jul. 16, 2008 in U.S. Appl. No. 11/468,237.
Non-Final Office Action dated Oct. 7, 2008 in U.S. Appl. No. 11/468,237.
Notice of Allowance dated May 19, 2008 in U.S. Appl. No. 10/217,666.
Non-Final Office Action dated Dec. 19, 2007 in U.S. Appl. No. 10/217,666.
Final Office Action dated Jul. 26, 2007 in U.S. Appl. No. 10/217,666.
Non-Final Office Action dated Feb. 15, 2007 in U.S. Appl. No. 10/217,666.
Advisory Action dated Dec. 26, 2006 in U.S. Appl. No. 10/271,666.
Final Office Action dated Oct. 16, 2006 in U.S. Appl. No. 10/217,666.
Non-Final Office Action dated Mar. 20, 2006 in U.S. Appl. No. 10/217,666.
Advisory Action dated Dec. 19, 2005 in U.S. Appl. No. 10/217,666.
Final Office Action dated Oct. 13, 2005 in U.S. Appl. No. 10/217,666.
Non-Final Office Action dated Jun. 7, 2005 in U.S. Appl. No. 10/217,666.
Advisory Action dated Mar. 11, 2005 in U.S. Appl. No. 10/217,666.
Final Office Action dated Dec. 30, 2004 in U.S. Appl. No. 10/217,666.
Botter, Mary Ellen, "Travel Notes", March 15, 1992, Denver Post, p. 2.T.
Final Office Action dated May 14, 2009 in U.S. Appl. No. 10/188,768.
Advisory Action dated Jul. 29, 2009 in U.S. Appl. No. 10/188,768.
Final Office Action dated May 26, 2009 in U.S. Appl. No. 10/347,105.
Advisory Action dated Jul. 29, 2009 in U.S. Appl. No. 10/347,105.
Non-Final Office Action dated May 26, 2009 in U.S. Appl. No. 11/468,228.
Non-Final Office Action dated May 26, 2009 in U.S. Appl. No. 11/468,237.
Notice of Allowance dated Nov. 18, 2008 in U.S. Appl. No. 11/611,037.
Final Office Action mailed Aug. 18, 2009 in U.S. Appl. No. 10/708,542.
Non-Final Office Action mailed May 19, 2009 in U.S. Appl. No. 10/908,544.
Non-Final Office Action mailed Oct. 2, 2009 in U.S. Appl. No. 10/347,105.
Final Office Action mailed Oct. 16, 2009 in U.S. Appl. No. 11/468,237.
Advisory Action mailed Dec. 17, 2009 in U.S. Appl. No. 11/468,237.
Final Office Action mailed Oct. 15, 2009 in U.S. Appl. No. 11/468,228.
Advisory Action mailed Dec. 17, 2009 in U.S. Appl. No. 11/468,228.
Non-Final Office Action mailed Dec. 9, 2009 in U.S. Appl. No. 11/831,602.
Final Office Action mailed Dec. 9, 2009 in U.S. Appl. No. 10/908,544.
Non-Final Office Action mailed Nov. 17, 2009 in U.S. Appl. No. 10/188,768.
Examiner's Interview Summary mailed Oct. 21, 2009 in U.S. Appl. No. 10/708,542.
Advisory Action mailed Oct. 28, 2009 in U.S. Appl. No. 10/708,542.
Non-Final Office Action mailed Nov. 19, 2009 in U.S. Appl. No. 10/708,542.

* cited by examiner

Round-Trip Request | Request Type: New Reservation ✓

Departure
From: Los Angeles
To: Denver
Date/Time: June 15, 8am

Ground Transportation
ABC Car Rental
Midsize Car

Lodging
XYZ Hotel
King Bed
Non-smoking room

Return
From: Denver
To: Los Angeles
Date/Time: June 17, 5pm

Trip Planning - Search

Traveller: Jane Smith  214-555-2355 (RexPort Company)          Caller: Peter Doe Navigation
Identify Traveller
Traveller Preferences
Trip Planning Corporate Policy
View Details AIR POLICY
Window
Direct: 3.45
Conn: 2.34

Depart From Location   [RexPort Headquarters]
                        Add Address Arrive By
Arrival Date    10PM
10/26/2002

Depart By
Depart Date    9AM
11/26/2002

Destination Location    Trip Option
[3600 E. University      □ Air
Phoenix, AZ 85000]       □ Car
Add Address              □ Hotel

[Search Trip]  [Blank Itinerary]  [Clear All]

SYSTEM AND METHOD FOR PROCESSING TRIP REQUESTS

CROSS-REFERENCE TO RELATED APPLICATIONS

This application is a divisional patent application of, and claims priority to, U.S. Non-Provisional patent application Ser. No. 10/347,105, entitled "SYSTEM AND METHOD FOR PROCESSING TRIP REQUEST" and filed on Jan. 17, 2003; which itself claims priority to both, and the benefit of, U.S. Provisional Patent Application Ser. No. 60/351,804, entitled "TRAVEL NETWORK SYSTEM AND METHOD" and filed on Jan. 25, 2002 and U.S. Non-Provisional patent application Ser. No. 10/217,666, entitled "INTEGRATED TRAVEL INDUSTRY SYSTEM" and filed on Aug. 12, 2002, all of which are hereby incorporated by reference in their entirety.

TECHNICAL FIELD

The present invention generally relates to the travel industry. More specifically, the present invention relates to an integrated travel industry system and methods that may be used to process trip requests independent of any computer reservation system (CRS).

BACKGROUND INFORMATION

The last half of the twentieth century, and particularly the last two decades, has been characterized by rapid changes in the travel industry. One example of the changes is the growth of the airline business that has resulted in the proliferation of travel agencies and other travel information groups that require access to large volumes of data in a "real time" environment. This growth has led to many technological advancements in computer reservation systems (CRS), also known as Global Distribution Systems (GDS), for the travel industry (The terms Global Distribution System (GDS) and Computer Reservation System (CRS) may be used interchangeably herein). The GDS is a computer network that provides travel agents and other travel information groups with access to travel inventory related to hotel, condominium, rental car, airline and/or the like. Examples of such inventory systems include the SABRE system, Amadeus, Galileo/Apollo, System One, and Worldspan. Traditionally, travel agents use a computer that connects directly to a GDS system, such as SABRE or Apollo.

Unfortunately, a direct connection between the travel offices and the GDS typically creates a reliance on the GDS, and the direct connection requirement often results in inefficient processing of traveler reservations. For example, additional problems have often arisen due to the complexity and cost related to maintaining and updating hardware and software, especially on those systems where there are multiple GDS networks and desktop standards. In addition, there is often a lack of connectivity between travel offices that utilize different GDS systems or configurations due to the private autonomous nature of many GDS networks. The autonomous nature of GDS networks lead to further inefficiencies such as the inability to deliver Internet access to the travel offices through the same system. Internet access is desired, as it would allow for the integration of traveler reservations with Internet fares and/or connections with vendor direct inventory.

SUMMARY OF THE INVENTION

In accordance with one aspect of the present invention, an integrated travel industry system comprises an integrated travel network having one or more centralized hub sites, at least one Global Distribution System connected to each of the hub sites, and at least one point of service terminal also connected to one of the hub sites.

In accordance with another aspect of the present invention, the travel industry system may further comprise a plurality of travel vendors that are connected directly to each of the hub sites of the network.

In accordance with a further aspect of the present invention, the travel industry system may also include a plurality of modules that are located on the point of service terminal. The modules may include an integrated trip request module, a trip planning module, a computer telephony integration module, a super passenger name record database, a customer database, a low fare search module, a customer relationship management module, and a workflow module.

In accordance with one embodiment of the present invention, a method for processing a trip request having trip information comprises receiving the trip request from a traveler, automatically routing the trip request to a travel counselor, checking for other trip requests for the traveler, and completing the trip request utilizing the trip information.

BRIEF DESCRIPTION OF THE DRAWINGS

A more complete understanding of the present invention may be derived by referring to the detailed description when considered in connection with the Figures, where like reference numbers refer to similar elements throughout the Figures, and:

FIG. 6 illustrates an exemplary formatted trip request form in accordance with an embodiment of the present invention;

FIG. 8A illustrates a diagram of an exemplary user interface for a trip planning module in accordance with an embodiment of the present invention;

DETAILED DESCRIPTION OF EXEMPLARY EMBODIMENTS

Figure 1:
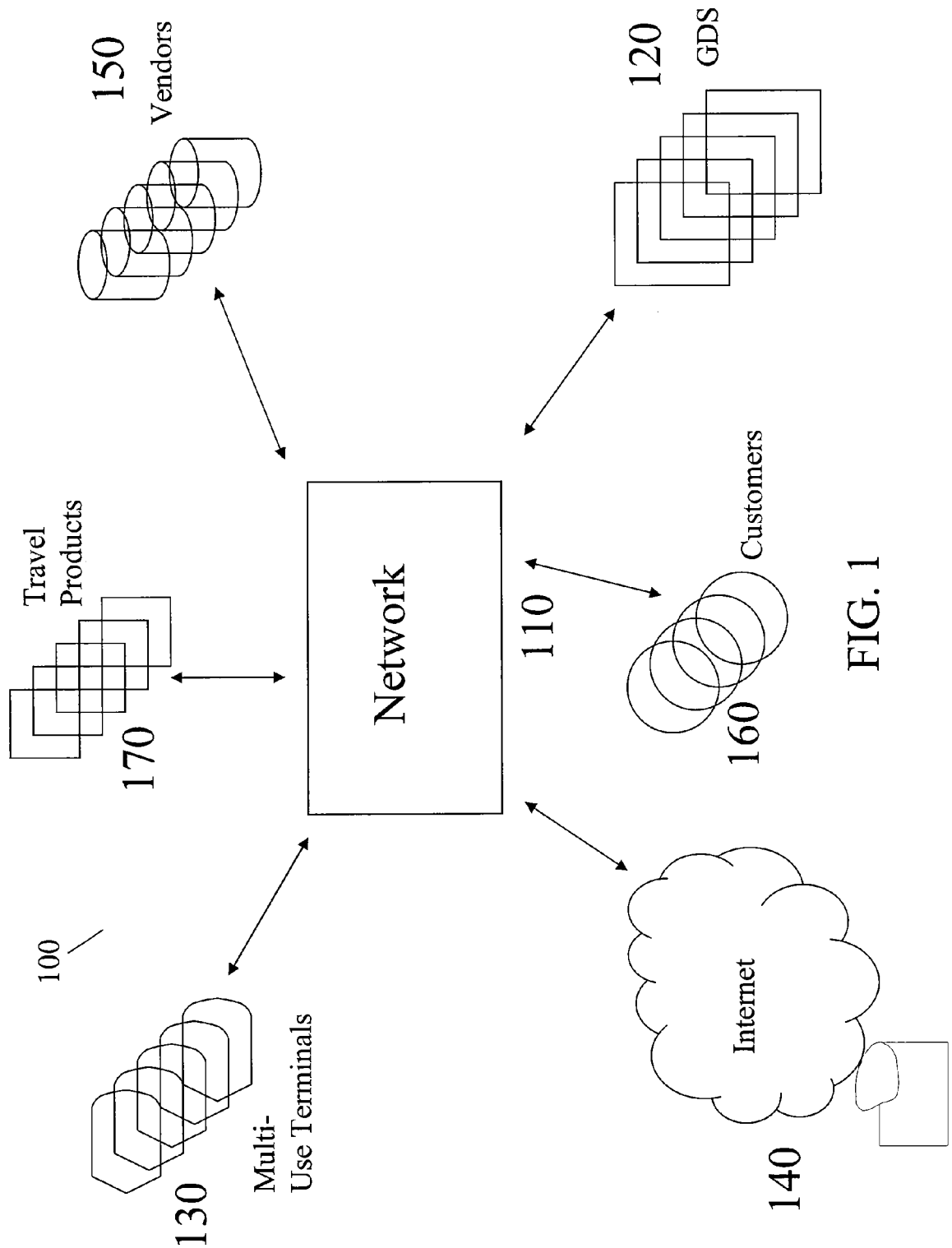
FIG. 1 illustrates a schematic diagram of a travel industry system in accordance with an embodiment of the present invention.

The present invention provides for an integrated travel industry system that includes a travel network that may be provided and managed by a single vendor that is particularly skilled in providing and servicing networks (e.g., AT&T, British Telecom). In this manner, a managed network can be provided that is monitored, in an exemplary embodiment, 24 hours a day, 7 days a week thus providing a single or reduced point of contact for outages, and further providing for real time and historical reporting. In accordance with various aspects of the present invention, the travel network may be divided into multiple sub-networks, where each sub-network may be managed by a single vendor or different varying vendors. That is, one sub-network may be managed by AT&T and another sub-network may be managed by British Telecom and the sub-networks may be connected together to form the travel network.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), and Microsoft's Visual Studio .NET, with the various algorithms being implemented with any combination of data structures, objects, processes, routines or other programming elements. Further, it should be noted that the present invention might employ any number of conventional techniques for data transmission, signaling, data processing, network control, and the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development, database operations, and other functional aspects of the system (and components of the individual operating components of the systems) and method may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The present systems and methods facilitate the integration of information and services between travel offices and between travel counselors at the various travel offices. In addition, the systems and methods facilitate integration with the Internet, Global Distribution Systems (GDS), alternate inventory (e.g., limousine providers), vendor direct systems, and/or other reservation processing technologies (e.g., document delivery, file finishing, trip planning) that does not fully rely upon GDS and/or is GDS independent. The terms Global Distribution System (GDS) and Computer Reservation System (CRS) will be used interchangeably herein. As stated above, the GDS includes any computer network that provides travel agents and other travel information groups with inventory access related to, for example, hotel, condominium, rental car, airlines, and/or the like. As stated above, examples of such inventory systems include the SABRE system, Amadeus, Galileo/Apollo, System One, and Worldspan.

Referring to FIG. 1, the present invention presents an integrated system 100 which enables multiple entities to access various services (e.g., travel services) in a manner that is independent from a particular computer system, such as a GDS system. This system facilitates technology independence from, or limited dependence on, the GDSs, thereby achieving a network that is business driven, business responsive and enabling a company to become the industry leader.

System 100 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, Windows XP, etc.) as well as various conventional support software and drivers typically associated with computers. User computer can be in a home or business environment with access to a network. In an exemplary embodiment, access is through the Internet through a commercially-available web-browser software package.

Communication between users and system 100 of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

With continued reference to FIG. 1, in accordance with an exemplary embodiment, travel industry system 100 comprises a travel network 110, one or more GDS systems 120, and one or more multi-use point of service (POS) terminals 130 located at travel offices and other sites. POS terminals 130 may include any computer or other Internet device including personal computers, workstations, servers, personal digital assistants (PDAs), and the like. The customer terminals may be located anywhere in the world and may be connected to travel network 110 such that the users of the terminals have access to GDS systems and other features of the system as will be described in detail below.

Travel network 110 is further configured to provide access to the Internet 140 and to a plurality of travel vendors 150 such as airline databases, car and hotel databases, train and bus databases, frequent flyer systems (e.g., Orbit), and the like. This network enables an open consistent vehicle for non-GDS communication such as e-mail, Internet and the like, which is, inter alia, less expensive and less complex than having to provide a separate network for non-GDS communications. It should be appreciated that providing access to the Internet will give e-mail access to POS terminal users of travel industry system 100. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997). Loshin, TCP/IP Clearly Explained (1997). All of these texts are hereby incorporated by reference.

Travel vendor databases may include databases for travel related services such as airlines, car rental, hotel, train, bus, limousines, and any other travel related service. As used in the system of the present invention, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

With continued reference to FIG. 1, external customers 160 may be connected directly to network 110, such that the external customers have direct access to the travel network. In this manner, customers 160 may access various features of the system as described below. In addition, travel products 170 may also be connected directly to network 110. Travel products 170 may include third party travel products such as file finishing, contract optimization, and robotics processing as is well known in the art.

In accordance with one embodiment of the present invention, travel industry system 100 may provide a suitable website or other Internet-based graphical user interface which is accessible by customers 160 and other users of the system. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

Figure 2:
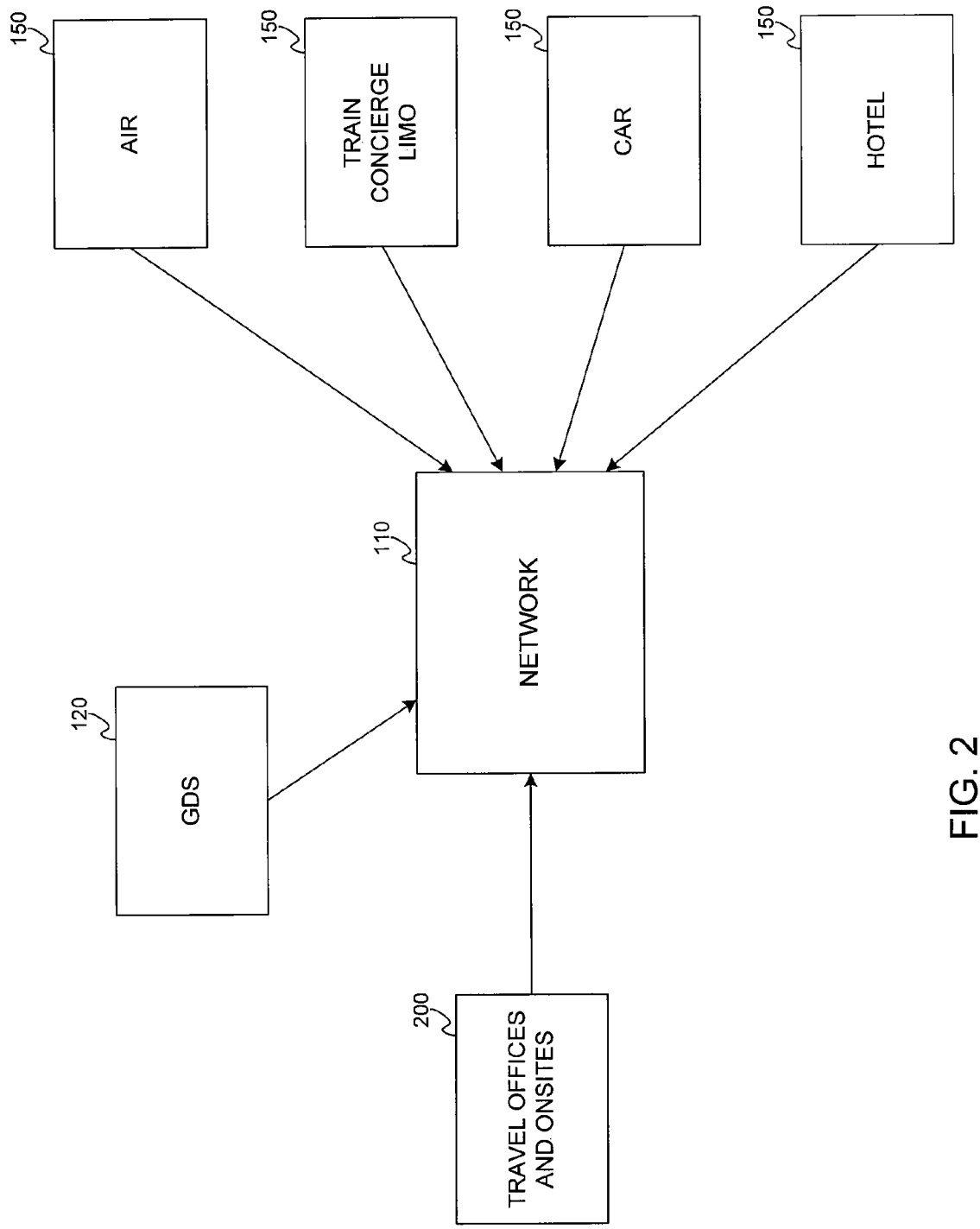
FIG. 2 illustrates a schematic diagram of a travel industry system in accordance with an embodiment of the present invention.

With reference to FIG. 2, in an exemplary embodiment, various components of travel industry system 100 are connected to network 110 such that a centralized connection to network 110 is obtained. For example, GDS systems 120, travel vendors 150, and multi-use terminals 130 at travel offices 200 and other sites may be centrally connected to network 110 such that users of the multi-use terminals have access to various components of system 100 such as GDS systems 120 and travel vendor databases 150. As used herein, "connected" may include any software and/or hardware for communicating or transmitting data.

Figure 3:
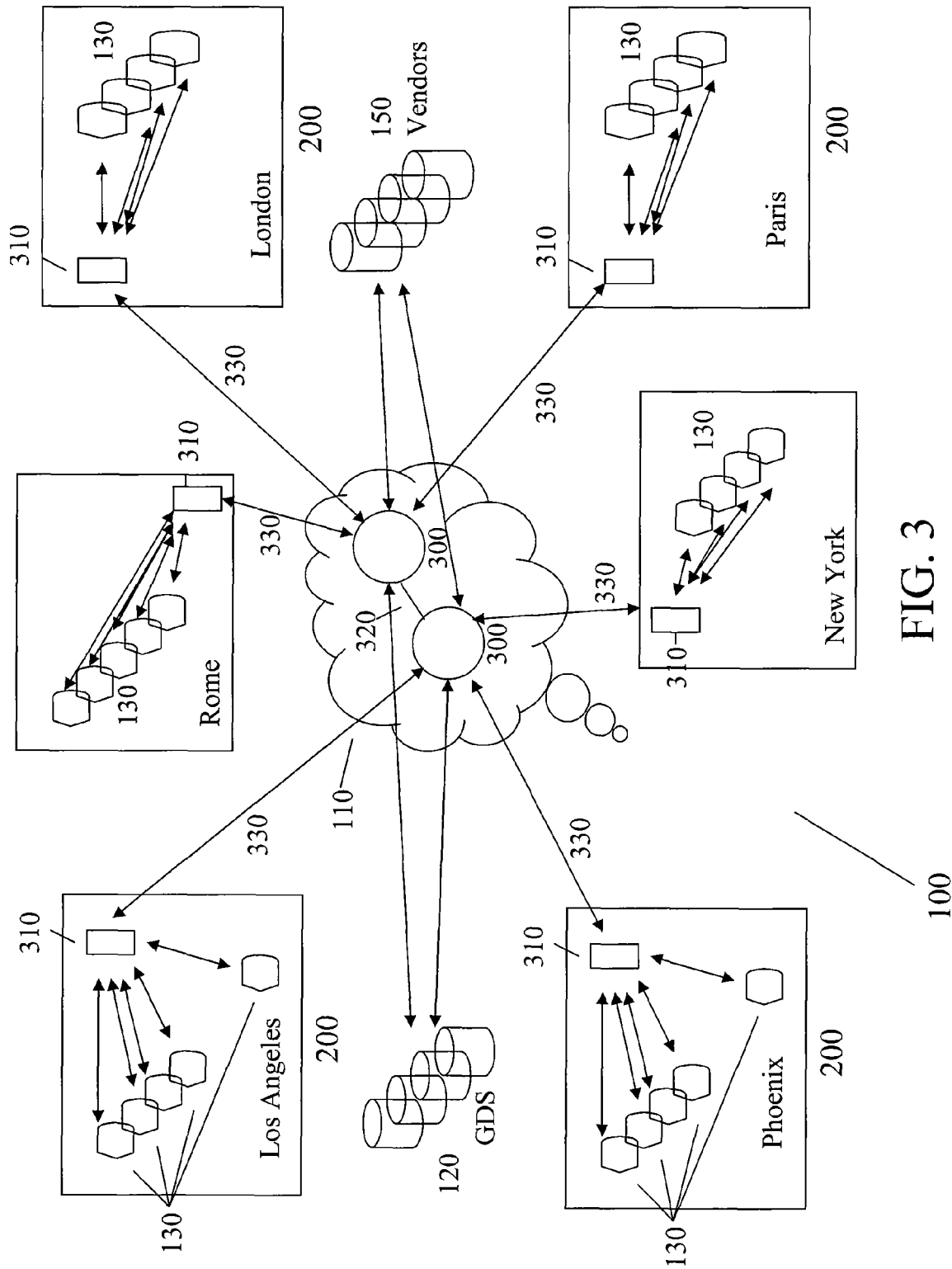
FIG. 3 illustrates a schematic diagram of an exemplary network in accordance with the present invention.

Referring now to FIG. 3, travel network 110, in an exemplary embodiment, comprises a frame relay network having one or more hub sites 300 that are used to connect travel offices and other users from around the world. As is well known in the art, frame relay networks are a type of network that is used to transport data from location to location using connections, such as network components 310, which may comprise a router or equivalent network device. For example, as illustrated in FIG. 3, there may be travel offices 310 in New York, Phoenix, Los Angeles, Rome, London, and Paris. Travel network 110 provides an integrated network such that any travel office in any city can communicate with any other travel office in any city which will allow for more efficient communication and distribution of information. In another example, memos and other information can now be distributed electronically utilizing travel network 110, thus saving time and money compared to previous systems where a travel office could not communicate electronically with another travel office that was utilizing a different GDS system. It will be appreciated that these locations 300 are for exemplary purposes only, and that the present invention is not limited to these locations.

Travel network 110 may use an Asynchronous Transfer Mode (ATM) backbone and multiple redundant data centers. For example, as illustrated in FIG. 3, network 110 may include two hub sites 300 that provide for data redundancy as will be described. Alternatively, network 110 may comprise one hub site or network 110 may comprise more than two hub sites. Data and connectivity redundancy is provided for when two or more hub sites 300 exist. Alternatively, travel network 110 may comprise any other suitable network that provides similar functionality to a frame relay network.

Hub sites 300 may be connected to each other by network connection 320. In accordance with one aspect of the present invention, network connection 320 may comprise an ATM backbone. Alternatively, network connection 320 may comprise a different type of network connection such as a Ti connection.

In an exemplary embodiment, one or more GDSs 120 are connected to network 110 at each of the hub sites 300. By connecting GDS 120 to the network at hub sites 300, the system provides for a centralized point of contact with all GDSs, as opposed to maintaining separate networks for each GDS. If one of the hub sites is disabled or connectivity to one of the hub sites is otherwise lost, then GDS 120 will still be accessible through one of the other hub sites 300.

Travel vendors 150 may also be connected to network 110 at each of the hub sites 300, thus providing redundant connectivity points for the travel vendors. By centralizing the connection to travel vendors 150, the system of the present invention allows a company to negotiate directly with air, car rental, hotel vendors, and the like, based on direct connections and fulfillment options, wherein connection is not limited only through GDS hosts. Direct connections to various vendors (e.g., air, car rental, hotel, rail, limousines, cruise lines, conference centers, ferries) make it possible for travelers to have a broader range of travel service choices. The present invention also allows alternative supply and distribution channels for products and services which may be provided by plugging a vendor directly into network 110. Alternatively, travel vendors 150 may be accessed via the Internet as described below.

Adding or removing GDS or travel vendor databases from the system is accomplished by adding or removing connections to the GDS and/or travel vendor database at hub sites 300. In this manner, it is not necessary to add or remove hardware equipment or software applications at the individual travel office. In one embodiment of the present invention, a central connection to all GDS and travel vendors exists. The system may communicate with the various GDS and travel vendors through a centralized component, such as a translation server. The translation server may communicate natively with the various GDS and travel vendor systems by utilizing an application programming interface (API) supplied by the GDS/travel vendor. Alternatively, the translation server may communicate with the various GDS and travel vendor systems by utilizing an industry accepted standard such as the Open Travel Alliance (OTA) standard. The translation server may communicate with the rest of the travel industry system 100 by using any standard communication protocol such as the extensible markup language (XML). Clients of the system can change or add GDS vendors without the need to add or replace hardware. In an exemplary embodiment of the present invention, the system includes minimal or no GDS-supplied hardware and allows a company to respond to technology or product improvements with minimal or no GDS approval thus providing for a host independent of individual GDSs.

The system will also allow for load leveling with GDSs to meet minimum contractual transaction amounts. For example, the particular GDS accessed by the travel counselor can be manipulated such that travel transactions can be moved around from GDS to GDS in order to meet minimum transaction amounts. This can be accomplished by changing the GDS accessed by the travel counselor (this is transparent to the travel counselor). In accordance with one embodiment of the present invention, a configuration item may be used that identifies the specific GDS that is to be accessed by the travel counselor. This configuration item may be stored in a configuration file or other similar storage location and accessed by the system as necessary.

In addition, if a new travel office is to be deployed, the travel office needs only to be connected to network 110 as will be described next. This allows for a short time to market for a new travel office. Each travel office may have one or more terminals 130 that provide user access to the system 100 through network component 310. In accordance with one aspect of the present invention, network components 310 are connected to hub sites 300 by network connections 330. Network connection 300 may be any type of suitable network connection such as T1, ATM, ISDN, and/or the like. Terminals 130 may have access to the various GDSs and travel vendor databases through hub sites 300. The multi-use terminals 130 may be used to provide a single source for accessing multiple GDSs and travel vendor databases for users (travel counselors). These multi-use terminals provide travel counselors with a new user-friendly, browser based Point of Service tool (a.k.a. Customer Information Gateway) that can be used for servicing customers as described in detail below. Travel counselors will only need to be trained on a single computer user interface/software application in order to be able to access a plurality of GDSs and travel vendor databases. Stated another way, multi-use terminal 130 will be operated the same or substantially the same way, no matter which GDS is accessed. In this manner, the terminals 130 of the system provide for a user-friendly operation (travel counselors will need little or no GDS format skills) and a customer focused reservation process with minimal or no restrictions by GDS limitations.

If one of the hub sites is disabled, terminal 130 may be automatically connected to another hub site 300 that is active via network connections 330 and 320, thus providing continuous network connection for the travel office and their customer terminals.

It will be appreciated that many applications of the present invention could be formulated. One skilled in the art will appreciate that network 110 may interface with any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris, Windows XP, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

Figure 4:
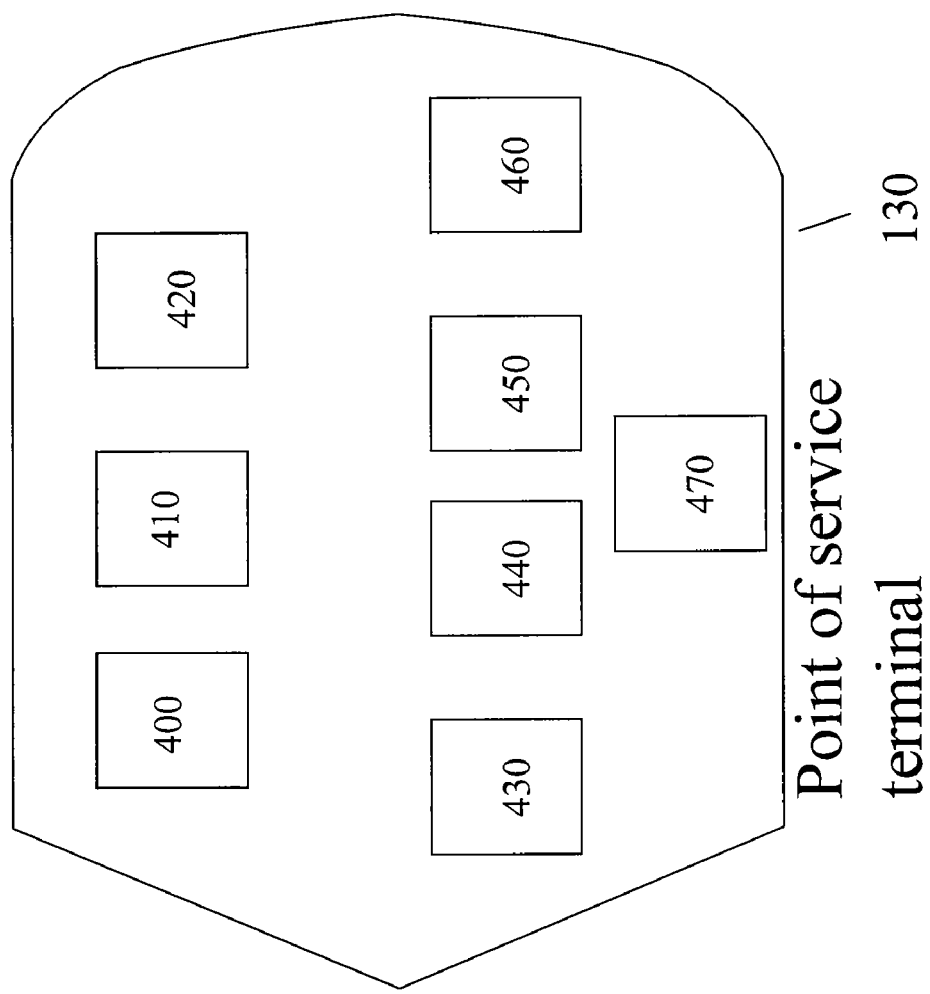
FIG. 4 illustrates a schematic diagram of an exemplary customer terminal in accordance with the present invention.

Referring now to FIG. 4, point of service (POS) terminal 130 provides for a travel counselor browser based point of service application that is GDS independent. It should be appreciated that this streamlines the reservation process and provides for greater operational efficiencies and higher levels of customer service. POS terminal 130 comprises, in an exemplary embodiment, an integrated trip request module 400, a trip planning module 410, a super passenger name record (PNR) module 420, a customer data module 430, a computer telephony integration module 440, a customer relationship management (CRM) module 450, a workflow module 460, and a low fare search module 470. These modules can be implemented with software and hardware components as described in detail next.

Integrated trip request module 400 includes software and/or hardware that may be used to process a trip request from a traveler. The trip request may include travel information that relates to the requirements for the trip. For example, the travel information may include the starting point and destination (or destinations) for the trip, dates of travel, preferred time of day for departure and arrival, mode of travel (e.g., air, train, bus, rental car, boat, and the like), hotel requirements (e.g., size of room, smoking/non-smoking, price range, location, etc.), rental car and/or limousine requirements (e.g., size, type, smoking/non-smoking, etc.), and the like. It will be appreciated that the travel information may vary from one trip request to another, as for example, a rental car may be required for one trip, but not required for another trip. As another example, one trip may require a same day departure and return, and thus no hotel is needed.

Figure 5:
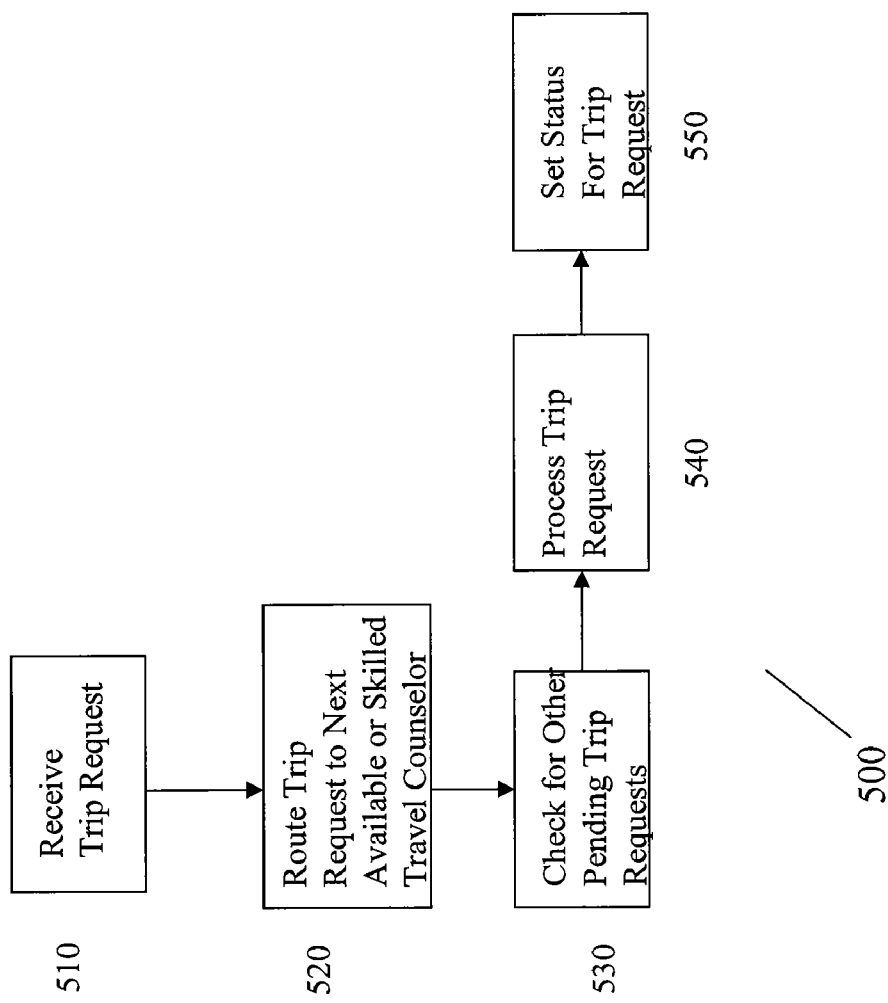
FIG. 5 illustrates a flow diagram of an exemplary process for handling a trip request in accordance with an embodiment of the present invention.

With reference to FIG. 5, an exemplary process 500 using trip request module 400 is illustrated for processing a trip request that is received from a traveler. The trip request may be received from the traveler (step 510) in various manners. In accordance with one aspect of the present invention, the traveler, or a representative for the traveler (e.g., assistant, secretary, co-worker, employee, travel coordinator, relative, friend, and the like) may access a formatted trip request form that is located on a web site associated with travel industry system 100. In accordance with one aspect of the present invention, the traveler may have to register with the web site before accessing the formatted trip request form. Alternatively, the formatted trip request form may be accessed via a software application (e.g., an e-mail software application such as Microsoft Outlook) and once the form or e-mail template is completed, the travel request may be sent by the software application via e-mail to system 100.

With momentary reference to FIG. 6, an exemplary formatted trip request form 600 is illustrated that contains various fields for entering travel information for the trip request. Using an internet browser (e.g., Microsoft Internet Explorer or Netscape Navigator) or a software application (e.g., Microsoft Outlook), the traveler or the traveler's representative may access the formatted trip request form, fill out the form by providing various travel information as necessary, and then e-mail or otherwise submit (using, for example, submit button 610 of formatted trip request form 600) the trip request form to system 100. It will be appreciated that the user/traveler only needs a web-browser in order to make a trip request or to modify an existing trip request. For example, the traveler may be able to use a web kiosk at an airport to make a trip request. Alternatively, the traveler may be visiting a relative or at another location where they have access to a computer with Internet access that may or may not belong to the traveler. However, as long as the traveler can access the Internet they will be able to make a trip request or submit a trip request that modifies or overrides a previous trip request. In accordance with one aspect of the present invention, the trip request form may be e-mailed to a pre-existing identified e-mail account. For example, submitting the trip request form by using submit button 610 and the like, may result in the trip request form being e-mailed to a pre-existing identified e-mail account. In accordance with another aspect of the present invention, there may be a different e-mail account for each travel client or company (e.g., the company that employs the traveler). Alternatively, there may be different e-mail accounts for departments or divisions within a company such that the trip requests may be processed more efficiently by travel counselors familiar with the travelers and requirements associated with a particular division as will be described in more detail below.

Trip request module 400 may receive the trip request (step 510) from the traveler by monitoring the various pre-existing e-mail accounts. For example, module 400 may monitor the pre-existing e-mail accounts for new e-mails from travelers that indicate a new or modified trip request has been received. Once a trip request is received, module 400 may present the trip request to a POS terminal 130. In accordance with another aspect of the present invention, module 400 may present the trip request to the next available POS terminal. Stated another way, similar to routing telephone calls to the next available customer service representative, module 400 may route the trip request to the next available or skilled travel counselor (step 520). Module 400 may route the trip request to a travel counselor who is available and/or who has the proper skills to handle the trip request. For example, only certain travel counselors may be trained to handle trip requests for a particular company. Module 400 may extract the trip information from the trip request and use the trip information to populate a screen pop that is used to present the trip request to the travel counselor via their computer terminal 130. A travel counselor, utilizing terminal 130, may then view the trip information in the screen pop and check the system to see if there are other trip requests pending for the traveler (step 530). The travel counselor may then process the trip request, and optionally other trip requests that are pending for the same traveler, using trip planning module 410 (step 540). In addition, the travel counselor may verify that there are no conflicts between the various trip requests for the traveler. This trip request module greatly reduces the time it takes the traveler and the travel agency to process a reservation. Once the trip request is processed as described in connection with the trip planning module 410 below, the travel counselor may set a status for the trip request (step 550) that indicates that the trip request was processed, or if unable to process the trip request, the status may indicate that an error occurred (e.g., no flights available) while processing the trip request. The status may be used by system 100 to monitor travel counselor for their availability, efficiency, and the like.

In accordance with an alternative embodiment of the present invention, the trip request may be processed automatically without manual or travel counselor intervention. For example, instead of routing the trip request to a travel counselor (see step 520 above), module 400 may extract the trip information from the trip request form and process the trip request using trip planning module 410 as described below. In this manner, the trip request may be processed without the need for human intervention. A switch setting, such as a value read from a configuration file, may be used to indicate whether manual or automatic processing of trip requests should take place.

In accordance with another alternative embodiment of the present invention, the traveler may submit a trip request by an unformatted e-mail message that may be generated by the traveler using an e-mail client (e.g., Microsoft Outlook). The unformatted e-mail message may be received by module 400 and presented to a travel counselor via a screen pop. The travel counselor may then proceed to process the trip request using trip planning module 410.

Trip planning module 410 comprises a software application that may be used to plan trips for travelers by providing for any type of reservation that may be required. For example, trip planning module 410 may prompt for details on the trip such as destination and dates of travel. The destination may be provided in a variety of forms including airport, destination city, exact address, and the like. Trip planning module 410 will then apply logic to the request using the travel policies (e.g., travel policies of the traveler's employer), preferred vendor booking preferences, and/or other customer profile information to build an optimal option for the trip that includes the travel reservations best suited for the traveler. If the travel counselor wants to change a specific reservation for a trip such as an airline reservation, then this may also be accomplished using trip planning module 410. Alternatively, trip planning module may be used to plan trips by separately making airline reservations, hotel reservations, car rental reservations, airport limousine reservations, and any other type of reservations that may be required.

Figure 7:
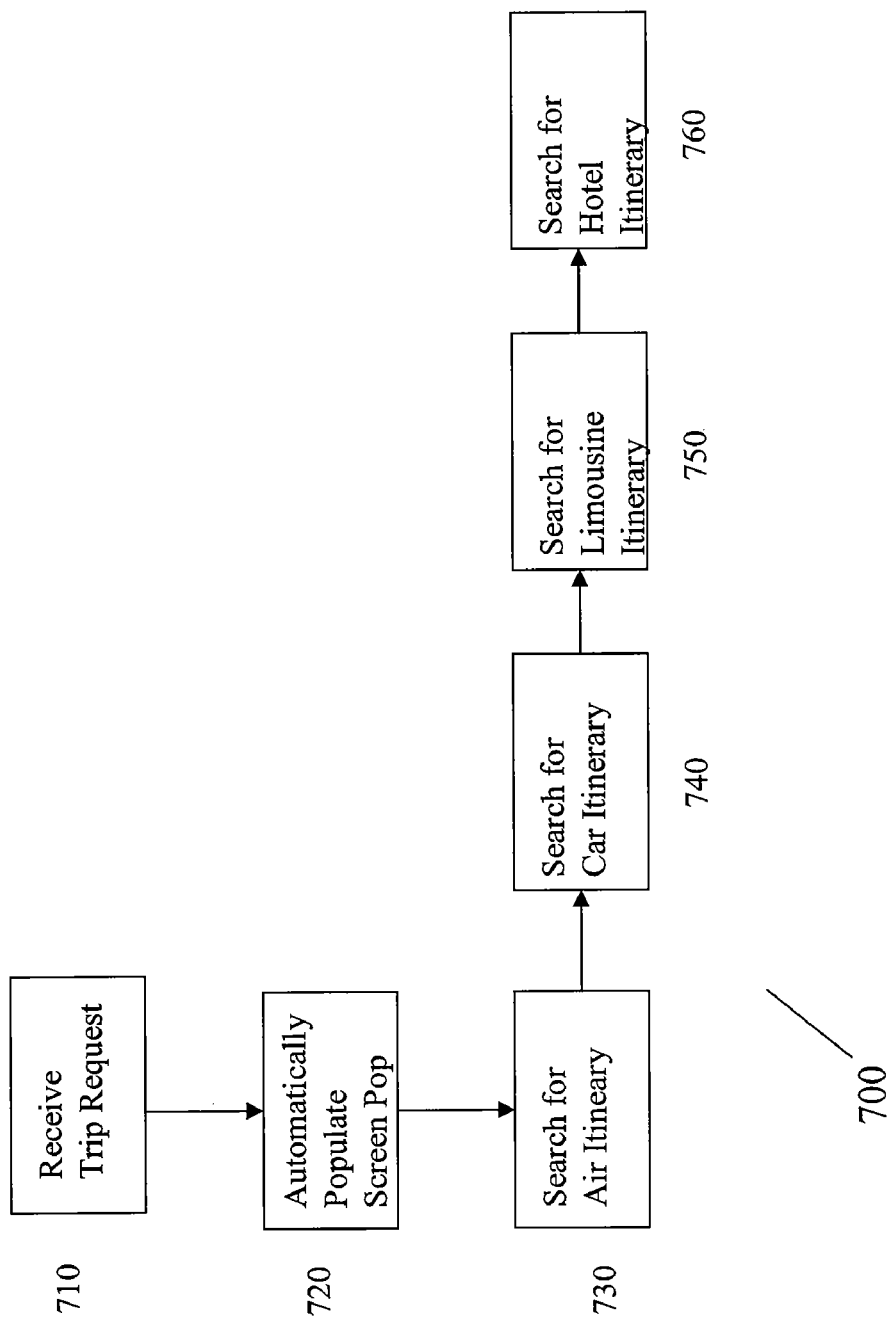
FIG. 7 illustrates a flow diagram of an exemplary process for planning a trip in accordance with an embodiment of the present invention.
Figure 8B:
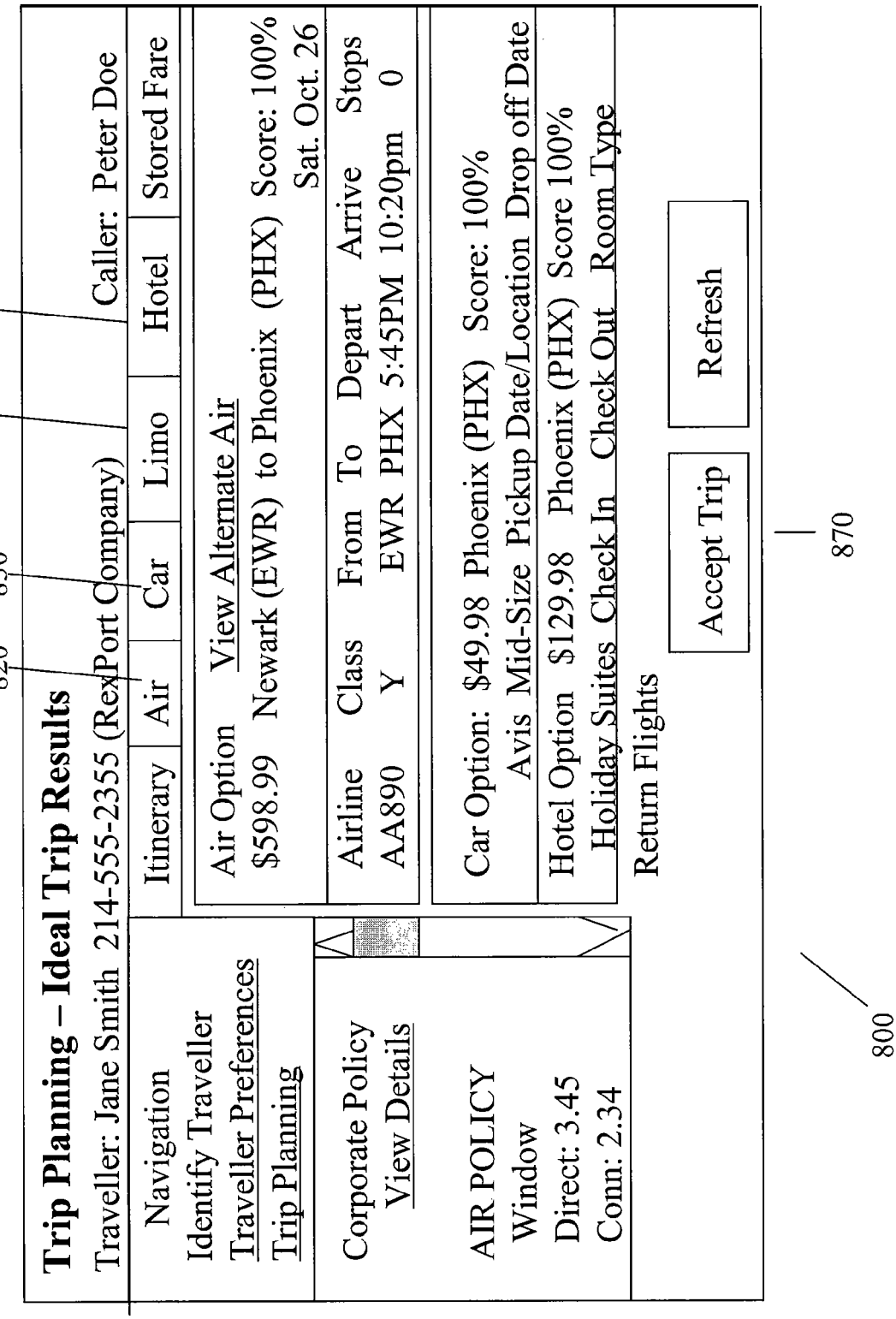
FIG. 8B illustrates a diagram of an exemplary user interface for a trip planning module in accordance with an embodiment of the present invention.
Figure 9:
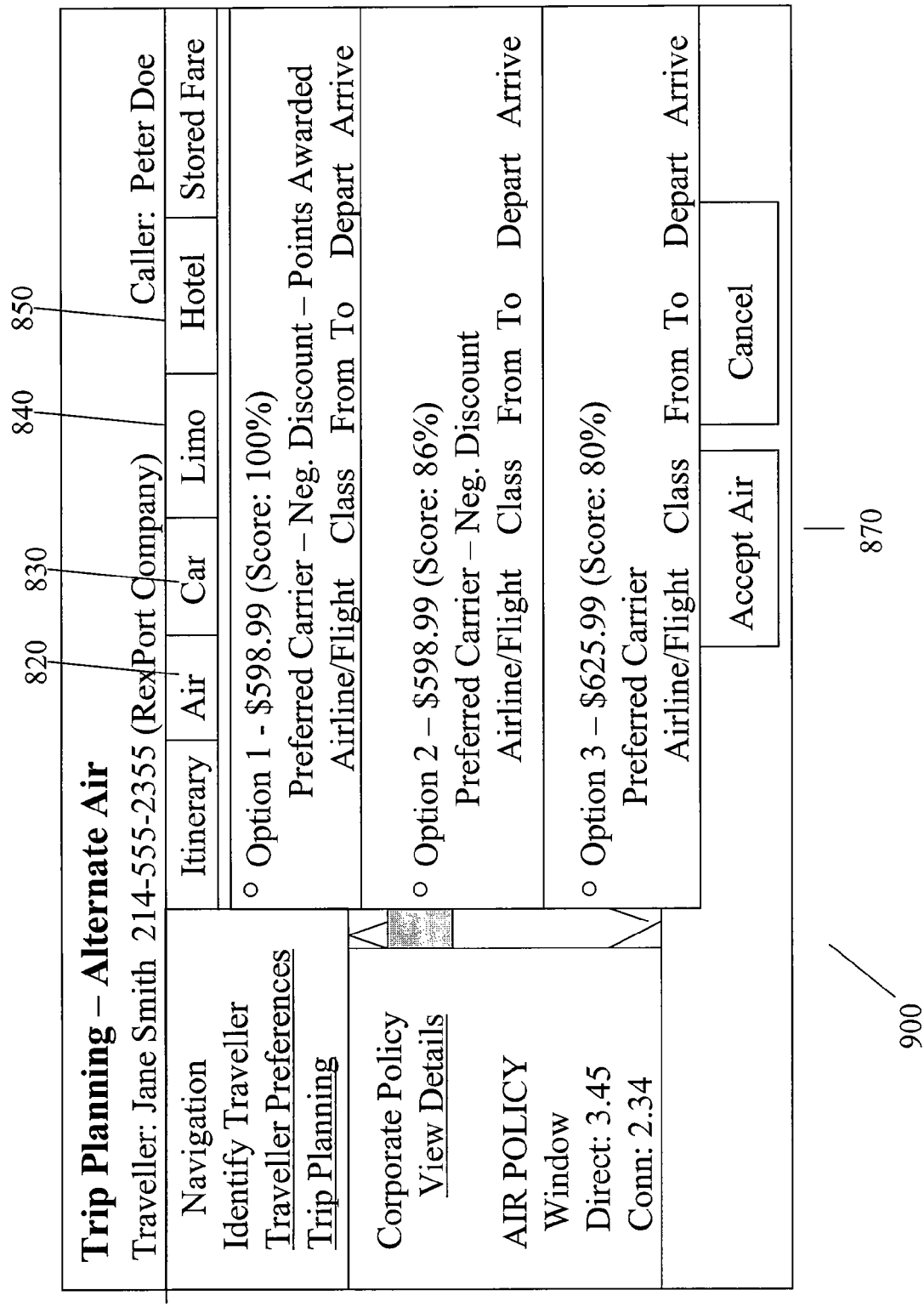
FIG. 9 illustrates an exemplary display for an air itinerary in accordance with an embodiment of the present invention.

With reference to FIG. 7, an exemplary process 700 using trip planning module 410 is illustrated for planning a trip in response to a trip request that is received from a traveler. The trip request may be received from the traveler (step 710) in various manners as described above in connection with trip request module 400 and a screen pop may be automatically populated with the trip information for the trip request (step 720). The traveler counselor may use trip planning module 410 to search for an air itinerary that matches the trip request (step 730). For example, with reference to FIGS. 8A and 8B, an exemplary user interface 800 for the trip planning module is illustrated. In accordance with one aspect of the present invention, the travel counselor may use one click of button 860 to request a search for air (or other mode of travel such as train, bus, boat, and/or the like), car, limousine, and hotel itineraries using all of the traveler's preferences and policies, and with the negotiated rates and fares applied. Buttons 820, 830, 840, and 850 may be used to perform a search for the air itinerary, a car itinerary (step 740), a limousine itinerary (step 750), and a hotel itinerary (step 760) for the trip where the results of the search are displayed in a weighted hierarchy (FIG. 9). In addition, the low fare search module 470 may be used to search for the lowest fares as will be described in detail below.

The various options for the different itineraries may be displayed using a weighted hierarchy that is based on various criteria such as, for example, the traveler's company policy, contracts, preferences and weightings. Information from the company policy may be entered manually and may include traditional policies such as first class restrictions, flight windows and the like. In addition, the company policy may include information on certain vendors/supplies that are not allowed to be used. Negotiations contracts with various air, hotel, rental car, and limousine vendors may be entered automatically via the customer data module 430 as described below. These automatic feeds may take place nightly or at any other scheduled interval. Customer (i.e., the traveler or the traveler's company) preferences may be loaded manually. Preferences may include information on vendors/suppliers that are preferred or non-preferred. However, if a non-preferred vendor is selected by the traveler, this should not result in an out of policy violation. Weightings is information that allows the traveler or traveler's company to specify how various vendors/suppliers should be sorted/displayed on the traveler counselor's computer terminal. The weighting applied to various criteria directly influences how the various vendors/suppliers are ordered on the traveler counselor's terminal. For example, if cost is an important criteria to a traveler/company, then that traveler would weight price higher than other criteria. Examples of criteria that may have weightings include price, travel distance, travel time, travel duration, enterprise service provider (ESP) vendor, and preferred vendor. With reference to FIG. 9, an exemplary display 900 using a weighted hierarchy for an air itinerary is illustrated. In addition, other policies such as the traveler's preference, cost, negotiated vendor rates, and the like, may also be used to determine the display hierarchy for the various itineraries. It will be appreciated that this will result in an optimized travel itinerary for the trip request and will allow the travel counselor to offer the optimized travel itinerary as a first choice to the traveler. In accordance with another aspect of the present invention, the traveler counselor may perform one click or selection of button 870 to accept the proposed optimized travel itinerary. The proposed itinerary will then be booked with the selected vendors for air, car, hotel and/or limousine services. The travel counselor may use the trip planning module to repeat the process for a plurality of trips.

Super passenger name record (PNR) module 420 comprises a database system that stores travel reservation information. The database system may be implemented with any of a variety of well known database standards such as Oracle, Sybase, and the like. The stored travel reservation information includes information for a particular trip reservation such as specific flight reservation information, hotel reservations, car rental information, and the like. In addition, PNR module 420 may be used to store information for a passenger's contact history with a travel office. For example, the names of travel counselors who assisted the passenger may be stored in PNR module 420. The PNR module may also be used to store fulfillment information that indicates which tickets were issued to the passenger and how much the passenger has been charged for the various reservations. It should be appreciated that storing the travel reservation details outside the GDS promotes data privacy and confidentiality. In addition, the super PNR module provides for consolidated storage of itineraries booked through multiple or direct vendors.

Customer data module 430 comprises a web enabled database system that allows travelers to access and update their traveler profiles over the Internet. In this manner, a user friendly and efficient technique is provided to travelers such that travelers can add additional preferences and the like to their travel profiles. The system provides for full integration of customer policy, profile, negotiated contracts, past/current trip information, and customer relationship management (CRM) data. Information stored in the customer data module database includes customer policies, for example, the corporate travel policies of a particular corporation which contains policies that employees are required to follow. For example, the corporate travel policies may prevent an employee from purchasing a first class airline fare or may require an employee to utilize certain car rental vendors. The customer data module database may also include the customer's negotiated contracts with various vendors (i.e., airlines, car rental agencies, hotels, and the like). The database may also include personal preferences for individuals such as seat preferences (aisle or window) and frequent flyer information. Unused ticket information may also be stored in the customer data module database so that it may be utilized by the low fare module as described above.

Customer data module 430 also provides the ability to accept customer HR feeds and data feeds to and from other products used by the traveler such as Corporate Travel Online (CTO), GetThere, and the like. An off-the-shelf tool may used for accepting customer HR feeds and data feeds. An example of such an off-the-shelf too is an Enterprise Application Integration (EAI) tool that is known in the art. In addition, customer data module 430 may be implemented such that useful reporting features are provided for the traveler. The travel profiles module may be implemented by using any of a variety of programming languages and techniques that are well known in the art and the database system may be implemented with any of a variety of well known database standards such as Oracle, Sybase, and the like.

Using the customer data module, customers can see their own information and update their own profiles via the Internet. For example, customers can access the customer data module by utilizing a standard Internet browser to access a web site available via the Internet. The customer then logs onto the customer data module using their secure username and password and thereby gain access to the functionality of the customer data module. In this manner, customers can create and update customer personal profiles. Different individuals may be given different access levels to the customer data module. For example, the travel administrators for a corporation may have global access so that they can modify the corporate travel policies for their corporation, while individual employees may have limited access such that they can only access and modify their individual profile.

Computer telephony integration module 440 allows for voice information (e.g., phone call) and data (e.g., traveler profile) to be converged at the travel counselor's desktop (i.e., POS terminal). Module 440 integrates off the shelf computer telephony interface (CTI) technology in order to provide voice-over-IP solutions, convergence of voice and data to the desktop (screen pop), and improved features for customer access and identification. In addition, computer telephony integration module 440 provides for the routing of e-mail, Internet, and other information to the travel counselor's desktop (i.e., media blending) 130 such as information from wireless devices (e.g., personal digital assistants), bookings, and customer questions and requests. When a customer (i.e., traveler) places a call to a call center (i.e., travel office), the customer will be prompted to entire a unique number or name, such as a personal identification number, that has been assigned to the customer. When a travel counselor answers the phone, all of the information for the customer will be displayed (referred to as a "screen pop") on the computer. Customer e-mails to the travel office can be routed to travel counselors in a similar manner that phone calls are routed. That is, the e-mails can be routed to next available agent or to an agent with a particular expertise. Using voice-over-IP (Internet Protocol) technology, phone calls into the call center can be distributed over the Internet to remote locations. For example, this will allow call center agents to receive calls at home or at other remote locations accessible by the Internet. In addition, built-in monitors may provide detailed reporting on calls to management. This detailed reporting can include information such as average time per call, number of calls per agent, and the like.

A customer relationship management (CRM) module 450 may include an off-the-shelf CRM system such as Oracle, Siebel, and other databases. CRM module 450 may be used to capture and store information about traveler and corporations' travel patterns, special interest, customer service inquiries/issues, profile information, frequent travel information, destination information, and specific requested data. This captured information may then be used to analyze and predict future travel spending.

Workflow module 460 comprises software that may be used for workflow and queue management. Since the point of service (POS) terminal 130 provides for a travel counselor browser based point of service application that is GDS independent, it is desired to have GDS independent workflow and queue management processing for the travel counselor. When the travel counselor completes a reservation and queues it for processing, the queued information may be extracted from the GDS queue and converted to text and routed to the first available agent/counselor for working.

Figure 10:
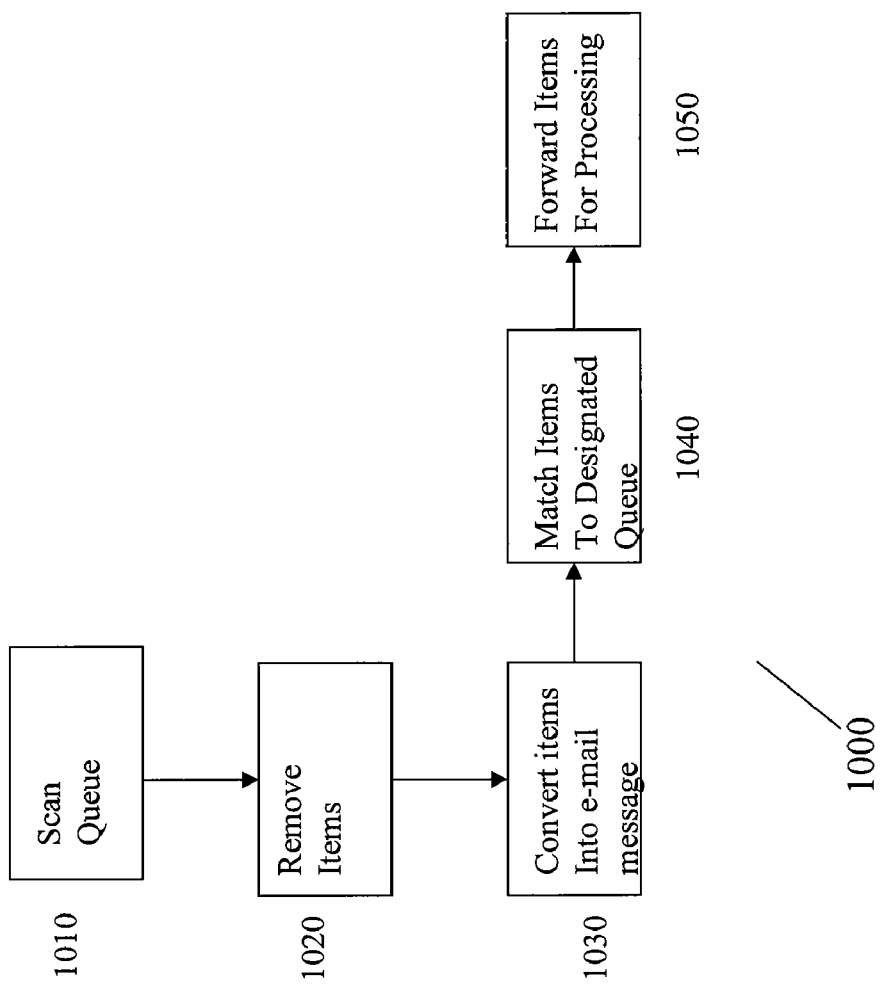
FIG. 10 illustrates a flow diagram of an exemplary process for a workflow module in accordance with an embodiment of the present invention.

With reference to FIG. 10, an exemplary process 1000 using workflow module 460 is illustrated for performing workflow and queue management for a plurality of travel counselors. Workflow module 460 may scan a queue (step 1010), such as a GDS queue, for messages or records that require further processing. In accordance with one aspect of the present invention, workflow module 460 may scan the queue at specified intervals. Examples of messages that may require further processing include trip requests, future ticketing, schedule changes, request for special services vendor confirmations, as well as other travel related operational processes. If there are messages in the queue that do not require further processing, then workflow module 460 may remove those messages (step 1020). In accordance with one embodiment of the present invention, a configuration file may be used to indicate which messages require further processing. For example, for a particular message type, there may be a configuration item that indicates how to handle the message type such as: "Ignore it", or put a header on the message and send as an e-mail message, and the like. There may be separate configuration entries for each company, or even for each traveler. An example of a message that might require further processing is when there is a schedule change to a flight segment and information for the schedule change is put into the queue. Another example is when there is a problem booking a reservation, then the reservation will be kicked back out to the queue for further processing.

When workflow module 460 identifies one or more messages that require further processing, workflow module 460 may convert each of the identified queue messages into a highly structured e-mail message (step 1030) with passenger/customer information and the operation that requires further processing. The structured e-mail message may then be forwarded (step 1050) to a designated queue for processing by the next available agent skilled for that type of operation. Workflow module 460 may match the structured e-mail message to a designated queue using skill based routing rules (step 1040) and then forward the e-mail message or formatted trip request to the matched queue for the next available agent to process.

Low fare search module 470 comprises a dynamic low fare search engine that can search fares from various sources including the Internet, direct connect vendors, proprietary databases (i.e., database of fares that is provided by a company affiliated with the POS terminal's travel office), GDS fares, Airline Tariff Publishing Company (ATPCO) system fares, company private or negotiated fares, and/or the like. By providing access to the Internet, Internet fares can be integrated into the low fare search and provided to the user for comparison for fares from other sources such as GDS and direct connection to travel vendor databases. Thus, system users can search dot com, direct connect, corporate and GDS fares. For example, a "web-bot" application can be used to search various airline web-sites on the Internet. In addition, the low fare search module can utilize unused ticket information when calculating the fare displays. The unused ticket information may be stored and tracked in customer data module 430 or in a similar database system. The unused ticket information may be obtained and analyzed in accordance with the systems and methods disclosed in patent application Ser. No. 09/346,085 filed Jul. 1, 1999; which is hereby incorporated by reference. The low fare search module may be implemented by a software application using any of a variety of programming languages and techniques that are well known in the art.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method of routing a trip request for a trip, comprising the steps of:
    connecting, using a connection, to a plurality of global distribution systems (GDSs), travel vendor databases, multi-use terminals of a plurality of travel counselors, and travel websites such that the plurality of travel counselors have access to the travel vendor databases and the plurality of GDSs, wherein the connection is accomplished via a frame relay network having a plurality of hubsites and using an asynchronous transfer mode (ATM) backbone and multiple redundant data centers;
    wherein the connection further includes a first translation server configured to communicate natively with a first hubsite in the plurality of hubsites, the plurality of GDSs, travel vendor databases, multi-use terminals of a plurality of travel counselors, and travel websites;
    wherein the first translation server is configured to communicate with the plurality of GDSs, travel vendor databases, multi-use terminals of a plurality of travel counselors, and travel websites via at least one of: (i) XML, (ii) a native application programming interface (API), and (iii) an open standard alliance;
    wherein the connection further includes a second translation server configured to communicate with the first hubsite and the first translation server,
    wherein the first hubsite is configured to route a trip request to the second translation server responsive to a disruption in connectivity to the first translation server;
    receiving the trip request, using the connection, via email;
    parsing, by a trip module, the trip request to obtain trip request data;
    selecting, using the trip module comprising a processor and a data store, among GDSs for the trip request, using the connection, based upon a comparison of a prior trip request and a contractual requirement, wherein said contractual requirement is embodied in a configuration item;
    storing, in said data store of said trip module, the selected GDS;
    scanning, using the connection, a queue containing a plurality of messages, wherein the plurality of messages are of a plurality of different types;
    identifying, automatically, a message that contains the trip request for a traveler, wherein the trip request comprises unformatted trip information;
    extracting, automatically, the unformatted trip information from the identified message;
    converting, automatically, the unformatted trip information into a formatted trip request;
    checking, using the connection, for conflicting trip requests for the traveler, wherein the step of checking comprises:
        identifying and retrieving, using the connection, stored trip requests for the traveler from a database containing a plurality of trip requests for a plurality of travelers;
        comparing trip information from the stored trip requests to the trip information from the received trip request;
        identifying conflicting trip requests based on the comparison of the trip information from the stored trip requests to the trip information from the received trip request;

forwarding, using the connection, the formatted trip request to a designated queue for a next available agent to process processing a second trip request, using the trip module, based upon said selected GDS and said contractual requirement.

2. The method according to claim 1, further comprising deleting a record that does not contain the trip request.

3. The method according to claim 2, wherein the step of forwarding the formatted trip request comprises:

matching the formatted trip request to a designated queue using skill based routing rules; and forwarding the formatted trip request to the matched queue for the next available agent to process.

4. The method according to claim 3, further comprising determining whether the trip request is a new trip request or a modified trip request.

5. The method according to claim 4, further comprising determining a company that is associated with the traveler; and wherein the step of forwarding comprises forwarding the formatted trip request to a designated queue for an agent that handles trip requests for the company associated with the traveler.

6. The method according to claim 3, further comprising setting a status for the trip request.

7. A method of routing a trip request for a trip, comprising the steps of:

connecting, using a connection, to global distribution systems (GDSs), travel vendor databases, multi-use terminals of a plurality of travel counselors, and travel websites such that the plurality of travel counselors have access to the travel vendor databases and the plurality of GDSs, wherein the connection is accomplished via a frame relay network having a plurality of hubsites and using an asynchronous transfer mode (ATM) backbone and multiple redundant data centers;

wherein the connection further includes a first translation server configured to communicate natively with a first hubsite in the plurality of hubsites, the plurality of GDSs, travel vendor databases, multi-use terminals of a plurality of travel counselors, and travel websites;

wherein the translation server is configured to communicate with the plurality of GDSs, travel vendor databases, multi-use terminals of a plurality of travel counselors, and travel websites via at least one of: (i) XML, (ii) a native application programming interface (API), and (iii) an open standard alliance;

wherein the connection further includes a second translation server configured to communicate with the first hubsite and the first translation server, wherein the first hubsite is configured to route a trip request to the second translation server responsive to a disruption in connectivity to the first translation server;

receiving the trip request, using the connection, via email;

parsing, by a trip module, the trip request to obtain trip request data;

selecting, using the trip module comprising a processor and a data store, among GDSs for the trip request, using the connection, based upon a comparison of a prior trip request and a contractual requirement, wherein said contractual requirement is embodied in a configuration item;

storing, in said data store of said trip module, the selected GDS;

scanning, using the connection, a queue containing a plurality of messages, wherein the plurality of messages are of a plurality of different types;

identifying, automatically, a message that contains the trip request for a traveler, wherein the trip request comprises unformatted trip information;

extracting, automatically, the unformatted trip information from the identified message;

converting, automatically, the unformatted trip information into a formatted trip request;

checking, using the connection, for conflicting trip requests for the traveler, wherein the step of checking comprises:

identifying and retrieving, using the connection, stored trip requests for the traveler from a database containing a plurality of trip requests for a plurality of travelers;

comparing trip information from the stored trip requests to the trip information from the received trip request;

identifying conflicting trip requests based on the comparison of the trip information from the stored trip requests to the trip information from the received trip request; and automatically processing the formatted trip request; and processing a second trip request, using the trip module, based upon said selected GDS and said contractual requirement.

8. The method according to claim 7, further comprising determining whether the trip request is a new trip request or a modified trip request.

9. A system for routing a trip request for a trip, the system comprising:

a connection which connects to a plurality of global distribution systems (GDSs), travel vendor databases, multi-use terminals of a plurality of travel counselors, and travel websites such that the plurality of travel counselors have access to the travel vendor databases and the plurality of GDSs, wherein the connection is accomplished via a frame relay network having a plurality of hubsites and using an asynchronous transfer mode (ATM) backbone and multiple redundant data centers, wherein the connection further includes a translation server configured to communicate natively with a first hubsite in the plurality of hubsites, the plurality of GDSs, travel vendor databases, multi-use terminals of a plurality of travel counselors, and travel websites;

wherein the translation server is configured to communicate with the plurality of GDSs, travel vendor databases, multi-use terminals of a plurality of travel counselors, and travel websites via at least one of: (i) XML, (ii) a native application programming interface (API), and (iii) an open standard alliance;

wherein the connection further includes a second translation server configured to communicate with the first hubsite and the first translation server, wherein the first hubsite is configured to route a trip request to the second translation server responsive to a disruption in connectivity to the first translation server;

wherein the connection is configured to receive the trip request via email, wherein a trip module is configured to parse the trip request to obtain trip request data;

wherein the connection is further configured to select among the plurality of GDSs, using the trip module comprising a processor and a data store, for the trip request based upon a comparison of a prior trip request and a contractual requirement, wherein said contractual requirement is embodied in a configuration item;
wherein the connection is configured to store, in said data store of said trip module, the selected GDS; and
a point of service terminal connected to at least one of the hub sites, the point of service terminal configured to perform the following steps:
scanning, using the connection, a queue containing a plurality of messages, wherein the plurality of messages are of a plurality of different types;
identifying, automatically, a message that contains the trip request for a traveler, wherein the trip request comprises unformatted trip information;
extracting, automatically, the unformatted trip information from the identified message;
converting, automatically, the unformatted trip information into a formatted trip request;
checking, using the connection, for conflicting trip requests for the traveler, wherein the step of checking comprises:
identifying and retrieving, using the connection, stored trip requests for the traveler from a database containing a plurality of trip requests for a plurality of travelers;
comparing trip information from the stored trip requests to the trip information from the received trip request; and
identifying conflicting trip requests based on the comparison of the trip information from the stored trip requests to the trip information from the received trip request; and
forwarding, using the connection, the formatted trip request to a designated queue for a next available agent to process.

10. The system of claim 9, wherein the point of service terminal is further configured to perform the step of deleting a record that does not contain the trip request.

11. The system of claim 10, wherein the point of service terminal is further configured to perform the step of forwarding the formatted trip request comprising:
matching the formatted trip request to a designated queue using skill based routing rules; and
forwarding the formatted trip request to the matched queue for the next available agent to process.

12. The system of claim 11, wherein the point of service terminal is further configured to perform the step of determining whether the trip request is a new trip request or a modified trip request.

13. The system of claim 12, wherein the point of service terminal is further configured to perform the step of determining a company that is associated with the traveler; and
wherein the step of forwarding comprises forwarding the formatted trip request to a designated queue for an agent that handles trip requests for the company associated with the traveler.

14. The system of claim 13, wherein the point of service terminal is further configured to perform the step of setting a status for the trip request.

15. The method of claim 1, further comprising propagating a user profile update via the translation server to the plurality of GDSs, travel vendor databases, multi-use terminals of a plurality of travel counselors, and travel websites.

16. The method of claim 15, further comprising propagating a pricing structure update via the translation server to the plurality of GDSs, travel vendor databases, multi-use terminals of a plurality of travel counselors, and travel websites.

17. The method of claim 16, further comprising querying to obtain trip information from the plurality of GDSs, travel vendor databases, multi-use terminals of a plurality of travel counselors, and travel websites.

18. The method of claim 17, further comprising retrieving stored trip requests for display to the agent, using the connection, wherein the retrieving is from the plurality of GDSs, travel vendor databases, multi-use terminals of a plurality of travel counselors, and travel websites.

19. The method of claim 18, further comprising performing a telephony function which is independent of the plurality of GDSs.

* * * * *